Feb. 2, 1932.  H. E. RIDGE  1,843,902
VEHICLE BUMPER
Filed Jan. 15, 1931  2 Sheets-Sheet 1
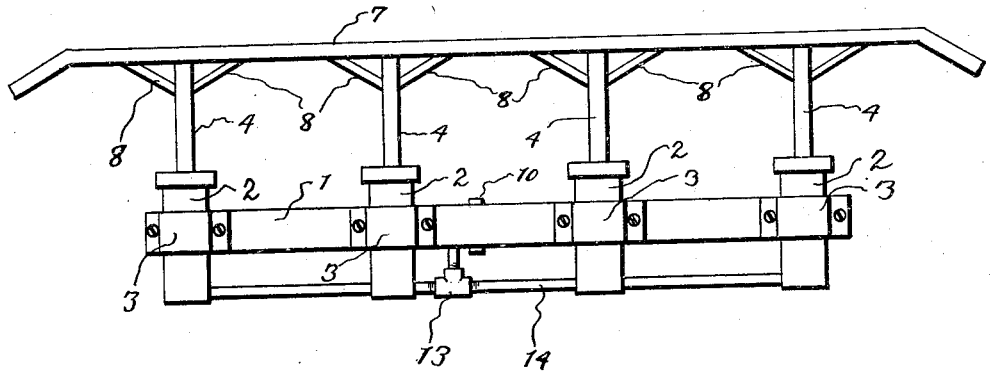
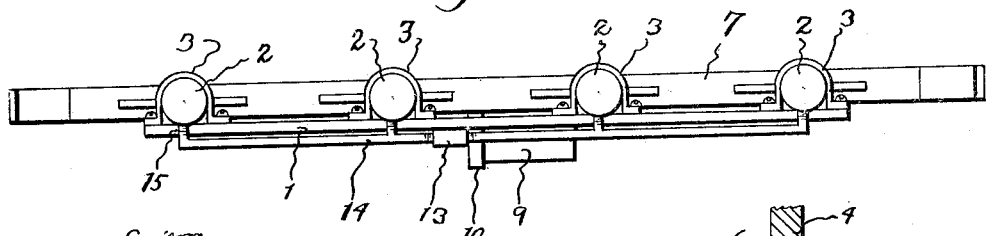
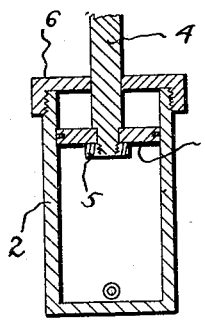
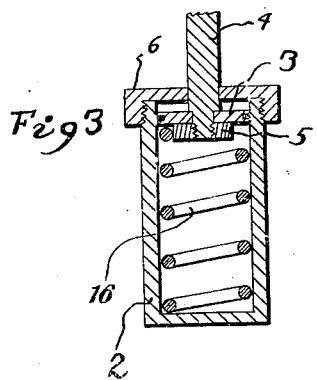
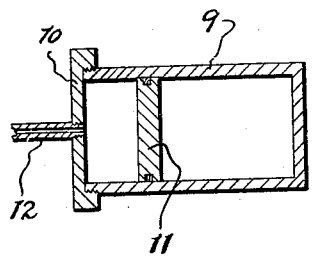
Inventor
H. E. Ridge
By Clarence A. O'Brien
Attorney

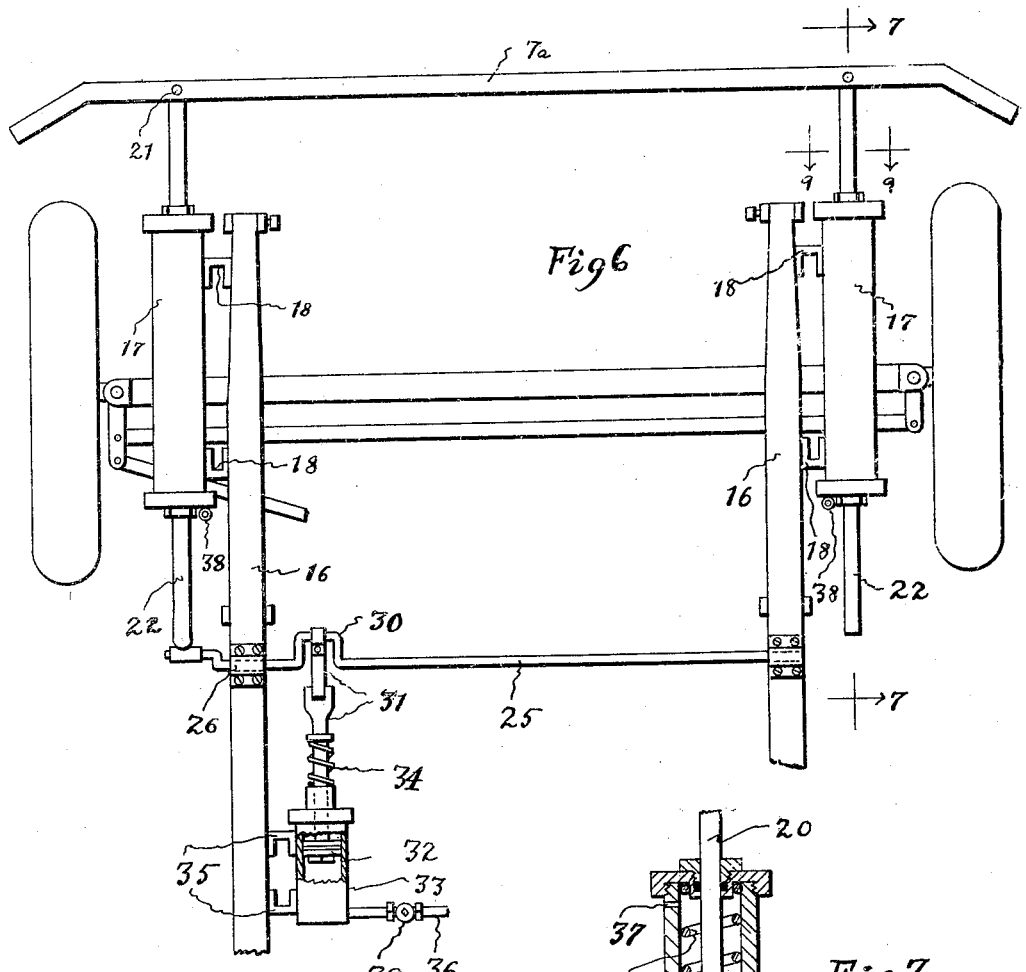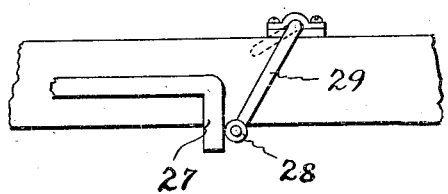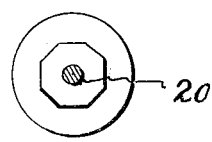

Patented Feb. 2, 1932

1,843,902

UNITED STATES PATENT OFFICE

HAYES E. RIDGE, OF CEDAR RAPIDS, IOWA, ASSIGNOR OF ONE-FOURTH TO JOHN E. McBRIDE, OF CEDAR RAPIDS, IOWA

VEHICLE BUMPER

Application filed January 15, 1931. Serial No. 508,966.

This invention relates to certain new and useful improvements in vehicle bumpers, and the primary object of the invention is to provide a bumper that can be readily mounted either on the front or rear or both at the front and rear of the truck, bus, automobile or other suitable vehicle without requiring material alterations in the vehicle.

A still further object of the invention is to provide a bumper of the above mentioned character, equipped with means for absorbing the shock or strain to which the bumper is subjected upon collision with a relatively hard or immovable object.

A still further object of the invention is to provide a vehicle bumper that may be readily mounted on the vehicle and is movable relative to the vehicle when brought into contact with an object, the latter being either stationary or movable.

A still further object of the invention is to provide a bumper of the above mentioned character, together with means whereby upon the application of force to the bumper, the brakes of the vehicle will be applied for bringing the vehicle to a stop.

Other objects and advantages of the invention will become apparent during a study of the following description, taken in connection with the accompanying drawings wherein:

Figure 1 is a plan view of the bumper.

Figure 2 is a rear elevational view of the bumper.

Figure 3 is a longitudinal sectional view taken through one of the cylinders having a spring arranged therein according to one form of the invention.

Figure 4 is a similar view, the cylinder in this instance being shown with the spring removed and adapted to contain oil.

Figure 5 is a longitudinal sectional view through the main cylinder.

Figure 6 is a top plan view of a modified form of the invention.

Figure 7 is a longitudinal sectional view taken substantially on the line 7—7 of Figure 6.

Figure 8 is a fragmentary elevational view showing the manner of imparting rotation to the shaft upon movement of the piston in one direction.

Figure 9 is a transverse sectional view taken substantially on the line 9—9 of Figure 6.

With reference more in detail to the drawings, it will be seen that the bumpers include a supporting bar 1 that is adapted to be mounted transversely of the vehicle, by any suitable means, either at the front or rear of the vehicle. Mounted on the bar 1 and arranged in longitudinally spaced relation are four or more cylinders 2 held on the bar 1 in a horizontal position through the medium of inverted U-shaped brackets 3 suitably bolted to the bar.

Mounted for reciprocation within each of the cylinders 2 is a piston 3 that is secured to the inner end of a piston rod 4 by a nut 5 threadedly engaging said inner end of the piston rod.

The piston rods 4 are slidable through suitable openings provided therefor in caps 6 threadedly engaging the forward open ends of the cylinders. The free ends of the piston rods 4 are connected by a suitable bumper rod 7 of any desired design or shape in cross section, and the bumper rod 7 is braced with respect to the piston rods 4 by suitable brace means 8.

Suitably mounted beneath the bar 1 is a main cylinder 9 provided at one end with a threaded cap 10. A blind piston 11 is reciprocable within the cylinder 9. Between the piston 11 and the closed end of cylinder 9 there is arranged in the cylinder compressed air, and an air pipe or conduit 12 has one open end threadedly engaged with the cap 10 to open inwardly of the cylinder 9 in advance of the piston 11.

The conduit pipe 12 leads to one branch of a T-coupling 13 arranged in a horizontal conduit 14 mounted rearwardly of the bar 1. Conduit 14 has branches 15 connected with the cylinders 2.

In one form of the invention, there may be arranged in each of the cylinders 2 a coil spring 16 impinging against the piston 3 for normally urging the piston rod 4 outwardly of the cylinder. Thus it will be seen that if the bumper 7 contacts with sufficient force against an object, the object being either moving or stationary, the shock to which the bumper 7 is subjected, will be transmitted to springs 11 for absorbing the shock. The pistons 3 moving inwardly of the cylinders 2 against the action of springs 16 will exert a pressure against blind piston 11 moving the latter against the compressed air in cylinder 9 so that the vehicle equipped with the bumper will be protected against undue jarring, and the persons or objects struck by the bumper 7 will receive little if any damage as is apparent.

In lieu of springs 16, cylinders 2 may be partially filled with suitable fluid whereby the pistons 3 are normally urged toward one end of the cylinders for projecting the piston rods 4 outwardly of the cylinders. In this connection when the bumper 7 comes in contact with a person, vehicle or the like pistons 3 will be forced inwardly of the cylinders 2 thus forcing the fluid from the cylinders through the conduit 14 and pipe 12 into cylinder 9 for action on piston 11 against the compressed air in cylinder 9. Thus the shock to which bumper 7 is subjected, is absorbed, and the possibility of injury to the person or vehicle struck, or to the vehicle equipped with my improved bumper is reduced to a minimum.

In Figures 6 to 9 inclusive I have shown a bumper together with means controlled by the bumper for applying the brakes of the vehicle upon the application of force to the bumper. As therein illustrated, 16'—16' designate the chassis bars of the vehicle. Mounted on each of the chassis bars 16' is an elongated cylinder 17, the same being supported in spaced relation to the chassis bar through the medium of brackets 18. Mounted for reciprocation in each of the cylinders 17 is a piston 19 that has a rod 20 extending therefrom and slidable through the forward end plate of the cylinder. The free ends of rods 20 are swivelly connected to the bumper 7a as at 21.

Extending rearwardly or from the opposite end of each piston 19 is a piston rod 22 that is slidable through the rear end plate of the cylinder.

Arranged within each cylinder 17 and convoluted about stem 20 is a coil spring 23 acting on the piston 19 oppositely to a coil spring 24 also arranged within the cylinder.

A crank shaft 25 is journalled in bearings 26 mounted on the chassis bars 16'. One rod 22 has one end thereof formed as at 27 to contact a roller 28 provided on a crank arm 29 at one end of crank shaft 25.

Crank shaft 25 is provided with a crank 30 to which is operatively connected one end of a sectional piston rod 31. Adjacent ends of the sections of piston rod 31 are pivotally connected together as illustrated. Piston rod 31 connects crank 30 with a piston 32 mounted for reciprocation within a fluid cylinder 33. A cushion spring 34 is suitably provided, and this spring aids in returning piston 32 to its normal position subsequent to the movement of the piston 32 in one direction upon rotation of crank shaft 25.

Cylinder 33 is suitably mounted on brackets 35 provided on a chassis bar 16. A fluid conduit 36 leads from the cylinder 33 to the fluid brake mechanism of the vehicle. In actual practice, it will be seen that in this embodiment of the invention, upon application of force to bumper 7a, pistons 19 will be moved against the action of springs 24, and a piston rod 22 engaging the crank 29 will impart rotation to shaft 25, causing piston 32 to move against the action of spring 34 thus forcing oil or like fluid from the cylinder and through the conduit 36 to the brake mechanism for applying the brakes of the vehicle.

Thus it will be apparent, that in the event of an accident, the vehicle will be brought to a complete stop and further damage to the vehicle being then less likely. In the event the vehicle so equipped with a bumper of this character, should strike a pedestrian, the force would be sufficient to cause an application of the brake and the possibility of the pedestrian being dragged by the vehicle is eliminated.

Each of the cylinders 17 at the forward end thereof is provided with a suitable vent opening 37, and at the opposite end thereof with a vent valve 38. Conduit 36 is also provided with a suitable check valve 39.

It is thought that from the foregoing description, taken in connection with the accompanying drawings that a clear understanding of the operation, structure, utility and advantages of an invention of this character will be had by those skilled in the art without a more detailed description thereof.

Even though I have herein shown and described the preferred embodiment of the invention, it is to be understood that the same is susceptible of various changes, modifications and improvements coming within the scope of the appended claims.

Having thus described my invention, what I claim as new is:

1. A vehicle bumper including in combination a plurality of relatively spaced cylinders, pistons reciprocable in the cylinders, rods for the pistons, and a bumper rod connecting the piston rods, a main cylinder adapted to contain compressed air, a blind piston reciprocable in said main cylinder, a conduit having branches connected with the first mentioned cylinders, and a second conduit connecting the first mentioned conduit with said main cylinder.

2. A vehicle bumper including in combination a plurality of relatively spaced cylinders, pistons reciprocable in the cylinders, rods for the pistons, and a bumper rod connecting the piston rods, a main cylinder adapted to contain compressed air, a blind piston reciprocable in said main cylinder, a conduit having branches connected with the first mentioned cylinders, and a second conduit connecting the first mentioned conduit with said main cylinder, and each of said plurality of cylinders having means therein yieldably acting on the pistons in each cylinder for normally urging the piston rods outwardly of said cylinders.

3. A vehicle bumper including in combination a relatively flat bar supported transversely of the vehicle, a plurality of horizontally disposed relatively spaced cylinders supported on the said bar and extending transversely relative to the bar, pistons mounted for reciprocation in the cylinders and having piston rods projecting forwardly therefrom, a bumper bar connecting the piston rods, and brace bars bracing said bumper bar with respect to said piston rods.

4. In a device of the class described, a crank shaft adapted to be mounted transversely of the frame of a vehicle, and provided with a crank arm, a horizontally disposed cylinder adapted to be mounted on the frame of the vehicle lengthwise of the vehicle, a piston mounted for reciprocation in the cylinder, oppositely extending rods connected with said piston, a bumper bar connected to one of said rods, the other of said rods being provided with an arm extending at an angle thereto, and engageable with the crank arm of said shaft for rocking the shaft upon movement of the piston in one direction, a cylinder adapted to be arranged in the brake mechanism of the vehicle, a piston operable in said last-mentioned cylinder and provided with a rod connected with the throw of said shaft.

In testimony whereof I affix my signature.

HAYES E. RIDGE.